United States Patent
Ohara

(10) Patent No.: US 9,797,451 B2
(45) Date of Patent: Oct. 24, 2017

(54) MAGNETIC FLUID SEALED BEARING AND FISHING REEL HAVING THE MAGNETIC FLUID SEALED BEARING

(71) Applicant: Globeride, Inc., Tokyo (JP)

(72) Inventor: Takeshige Ohara, Tokyo (JP)

(73) Assignee: GLOBERIDE, INC., Tokyo (JP)

(*) Notice: Subject to any disclaimer, the term of this patent is extended or adjusted under 35 U.S.C. 154(b) by 457 days.

(21) Appl. No.: 14/534,412

(22) Filed: Nov. 6, 2014

(65) Prior Publication Data
US 2015/0122930 A1    May 7, 2015

(30) Foreign Application Priority Data

Nov. 6, 2013   (JP) .................. 2013-230469

(51) Int. Cl.
| A01K 89/01 | (2006.01) |
|---|---|
| F16C 33/76 | (2006.01) |
| A01K 89/015 | (2006.01) |
| F16C 33/78 | (2006.01) |

(Continued)

(52) U.S. Cl.
CPC ............ F16C 33/765 (2013.01); A01K 89/01 (2013.01); A01K 89/015 (2013.01); A01K 89/0193 (2015.05); A01K 89/011223 (2015.05); F16C 33/7846 (2013.01); F16C 33/7889 (2013.01); F16J 15/43 (2013.01); F16C 19/06 (2013.01)

(58) Field of Classification Search
CPC .................. A01K 89/01; A01K 89/015; A01K 89/011223; A01K 89/0193; F16C 33/765; F16C 33/7889; F16C 33/7846; F16J 15/43

See application file for complete search history.

(56) References Cited

U.S. PATENT DOCUMENTS

| 4,407,508 A | 10/1983 | Raj et al. |
|---|---|---|
| 4,628,384 A | 12/1986 | Raj et al. |
| 4,692,826 A | 9/1987 | Raj et al. |

(Continued)

FOREIGN PATENT DOCUMENTS

| GB | 2 146 079 | 4/1985 |
|---|---|---|
| JP | 60-60330 A | 4/1985 |

(Continued)

OTHER PUBLICATIONS

Extended European Search Report dated Jun. 11, 2015 for Appln. No. 14191376.4.

(Continued)

*Primary Examiner* — Emmanuel M Marcelo
(74) *Attorney, Agent, or Firm* — Pillsbury Winthrop Shaw Pittman, LLP

(57) ABSTRACT

Provided is a magnetic fluid sealed bearing with which torque can be reduced without impairing a water and dust proof effect. A magnetic fluid sealed bearing according to the present disclosure includes a magnetic fluid retained by a ring-shaped magnet in an opening between an inner ring and an outer ring to seal a plurality of rolling members. The magnet is magnetized such that their magnetic poles point to an axial direction. The bearing further includes a ring-shaped outer polar plate and a ring-shaped inner polar plate sandwiching the ring-shaped magnet therebetween, one side of the polar plates being fixed to one of the inner ring and the outer ring, and the other side of the polar plates facing a clearance.

16 Claims, 10 Drawing Sheets

(51) Int. Cl.
*F16J 15/43* (2006.01)
*F16C 19/06* (2006.01)

(56) References Cited

U.S. PATENT DOCUMENTS

| | | | | |
|---|---|---|---|---|
| 4,898,480 A | * | 2/1990 | Raj | F16C 33/6644 277/410 |
| 4,973,064 A | * | 11/1990 | Hosoya | F16C 33/765 277/410 |
| 5,325,004 A | * | 6/1994 | Mori | F16J 15/43 310/67 R |
| 2012/0048981 A1 | * | 3/2012 | Ohara | A01K 89/0108 242/230 |
| 2015/0063733 A1 | | 3/2015 | Ohara | |
| 2016/0061263 A1 | | 3/2016 | Ohara | |
| 2017/0037905 A1 | | 2/2017 | Ohara | |

FOREIGN PATENT DOCUMENTS

| | | |
|---|---|---|
| JP | 63-246577 A | 10/1988 |
| JP | 2011-155944 A | 8/2011 |
| JP | 2013-000110 | 1/2013 |
| WO | 2013161625 A1 | 10/2013 |

OTHER PUBLICATIONS

Chinese Office Action dated Sep. 1, 2016 for Appln. No. 201410636585.6.
Non-Final Office Action Japanese Patent Application No. 2013-230469 dated Feb. 23, 2017 with English translation.
Office Action dated May 11, 2017 in Chinese Application 201410636585.6.

* cited by examiner

MAGNETIC FLUID SEALED BEARING AND FISHING REEL HAVING THE MAGNETIC FLUID SEALED BEARING

CROSS-REFERENCE TO RELATED APPLICATIONS

This application is based on and claims the benefit of priority from Japanese Patent Application Serial No. 2013-230469 (filed on Nov. 6, 2013), the contents of which are hereby incorporated by reference in their entirety.

TECHNICAL FIELD

The present disclosure relates to a magnetic fluid sealed bearing that is disposed on various drive force transmission mechanisms in such a manner as to support a rotation shaft so as to be rotatable so as to prevent foreign substances such as dusts and water from entering inside. The disclosure also relates to a fishing reel in which such a magnetic fluid sealed bearing are provided as a support member for a rotation shaft of a drive force transmission mechanism.

BACKGROUND

Conventional rotation shafts provided in various drive force transmission mechanisms are rotatably supported via bearings. For such rotation shafts, so-called ball bearings are used in order to improve rotation performance of the rotation shafts. Such ball bearings include multiple rolling members (rolling elements) circumferentially disposed between inner and outer rings.

Such bearings are used as support members for rotation shafts of drive force transmission mechanisms in various drive units, and some drive units are desired to prevent foreign substances such as dusts and water from penetrating through the bearings into the units. Moreover, when foreign substances enter into the bearings themselves, rotation performance of such shafts could be deteriorated and noise could be caused. To prevent this, an elastic seal member is provided on a portion of the periphery of a rotation shaft proximate to a bearing to shut out water and dusts from the bearing, however, the rotation performance of the rotation shaft may be degraded due to contact pressure caused by the elastic seal member. Especially for a double-bearing type fishing reel (a baitcasting reel) which also serves as a drive unit requires smooth rotation of a rotation shaft that rotatably supports a spool, and it is desirable that a bearing of the reel is formed in such a manner as to shut out foreign substances and have a low torque.

A magnetic fluid sealed bearing (a bearing with a magnetic sealing mechanism) is known for preventing foreign substances from penetrating through the bearing without degrading the rotation performance of the rotation shaft. For example, Japanese Patent Application Publication No. 2013-110 (the "'110 Publication") discloses a fishing reel having a built-in bearing with a magnetic sealing mechanism wherein the bearing supporting a rotation shaft rotationally driven by handle operation is sealed with a magnetic fluid. The bearing of the fishing reel disclosed in the '110 Publication has a sealing structure wherein a magnetic fluid is retained between an inner ring or an outer ring of the bearing and a retaining plate (polar plate) retains a magnet. More specifically, magnetic body is disposed between the inner ring and the outer ring to block a rolling member, one side of the magnetic body is fixed, and a magnetic fluid is filled in a clearance on the other side of the magnetic body thereby the rolling member is hermetically sealed. In this way, penetration of foreign substances into the rolling member section can be prevented.

However, the bearing disclosed in the '110 Publication cannot securely shut out foreign substances entering from the fixed sides of the magnet and the polar plate. When this bearing is applied to a fishing reel used in a harsh environment where seawater, dusts and the like tend to adhere or penetrate, the seawater enters inside the reel, and the seawater in the bearing may degrade smoothness of the bearing, making it impossible to maintain the smooth rotation for a long period.

Especially when the bearing of the '110 Publication is provided in a baitcasting-type fishing reel (double-bearing reel), it is preferably configured to have a reduced torque in addition to the water and dust prevention feature. However, as closely studying components of the magnetic fluid sealed bearing, there are some factors that make it difficult to reduce the torque. One of the factors is a magnetic circuit formed by the magnet and the polar plate retaining the magnet when the magnetic fluid seal is disposed between the inner and outer rings of the bearing. Due to the magnetic circuit, a force to attract the inner and outer rings closer to each other is generated, and this force can be a load (resistance) to rotation of the rolling member. In this case, when the clearance between the polar plate and the inner ring (or outer ring) is small, the magnetic force of the formed magnetic circuit increases, which increases retaining capability (sealing effect) of the magnetic fluid. However, the attraction force to bring the inner ring and the outer ring close to each other is also increased and thereby the load on the rolling member (rolling element) is increased, resulting in a high torque. Furthermore, when the magnetic force is generated on the rolling member side, the attraction force between the rolling member and the inner and outer rings with which the rolling member is contacted is increased, resulting in another load to increase the torque. In other words, in order to reduce the torque while enhancing the water and dust prevention feature in the configuration where the magnetic fluid seal is provided between the inner ring and the outer ring, it is important to adjust the magnetic force (generated by the magnetic circuit) that brings the inner and outer rings close to each other such that the seal effect is not lost and a strong magnetic field is not generated on the rolling member side.

The present disclosure is intended to overcome the above problems. An object of the present disclosure is to provide a magnetic fluid sealed bearing with which torque can be reduced without impairing a water and dust proof feature, and a fishing reel in which the magnetic fluid sealed bearing is provided.

SUMMARY

To overcome the above problem, the present disclosure provides a magnetic fluid sealed bearing including an inner ring, an outer ring, a plurality of rolling members placed between the inner ring and the outer ring, and a ring-shaped magnet disposed in the opening between the inner ring and the outer ring to retain a magnetic fluid for sealing the plurality of rolling members. The ring-shaped magnet is magnetized such that their magnetic poles point to an axial direction. The bearing further includes a ring-shaped outer polar plate and a ring-shaped inner polar plate sandwiching the ring-shaped magnet therebetween, one side of the polar plates being fixed to one of the inner ring and the outer ring, and the other side of the polar plates facing a clearance. An outer ring magnetic fluid is retained at least one of between the outer ring and the outer polar plate, between the outer ring and the inner polar plate, and between the outer ring and the magnet. An inner ring magnetic fluid retained at least one of between the inner ring and the outer polar plate, between the inner ring and the inner polar plate, and between the inner ring and the magnet.

The above-described magnetic fluid sealed bearing is disposed at a position to support a rotation (driving) shaft of various driving units. Because the ring-shaped magnet and the outer and inner polar plates sandwiching the magnet retain the inner ring magnetic fluid and the outer ring magnetic fluid at the inner and outer rings respectively in the above-described magnetic fluid sealed bearing, it is possible to securely prevent foreign substances such as dust and water which tend to run down along the inner surfaces of the inner ring and the outer ring. Therefore, the rotation performance of the bearing will not be degraded and it is possible to keep smooth rotation of the rotation shaft for a long period. The inner ring magnetic fluid and the outer ring magnetic fluid are retained by the magnetic circuits formed by the magnet and the outer and inner polar plates sandwiching the magnet, however a strong magnetic field is not generated on the rolling member side because the inner polar plate exists between the magnet and the rolling member. Therefore the attraction force between the rolling member and the inner and outer rings contacting the rolling member is reduced and thus the torque can also be reduced.

It is preferable that the above-described magnetic fluid sealed bearing be provided for a rotation shaft of various fishing reels that are used in harsh environments. A double-bearing reel which is known as a casting reel among others requires an enhanced free-rotation of the spool in addition to the water and dust proof feature, and therefore it is preferable that the bearing supporting such a spool shaft rotatably be configured to have a low torque. The magnetic fluid sealed bearing provided for a spool shaft of such fishing reels may have a certain limited size, and the size of a clearance in which the magnetic fluid is retained is set about 0.05-0.03 mm so as to reduce the torque as well as to obtain the water and dust proof effects.

According to the disclosure, it is possible to realize a magnetic fluid sealed bearing with which torque can be reduced without impairing a water and dust proof feature, and a fishing reel with such feature.

DESCRIPTION OF THE PREFERRED EMBODIMENTS

Figure 1:
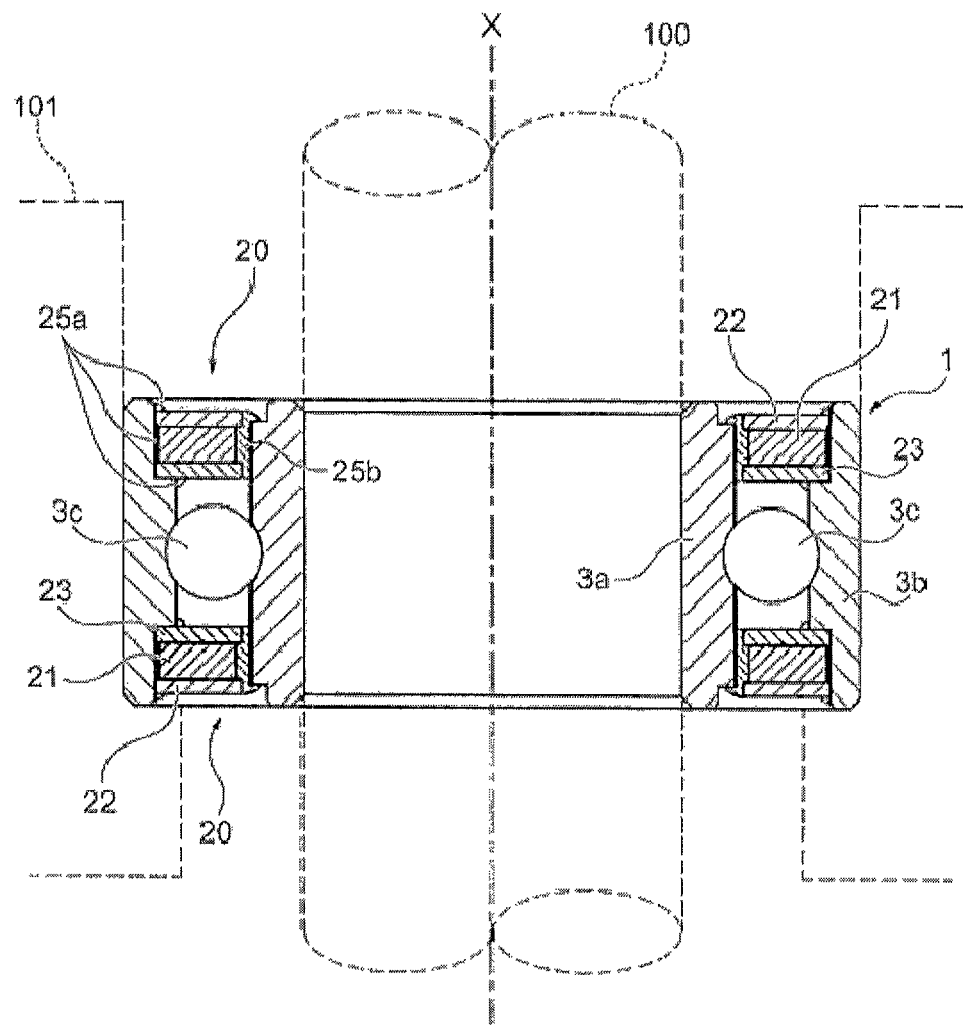
FIG. 1 illustrates a first embodiment of a magnetic fluid sealed bearing according to the disclosure.
Figure 2:
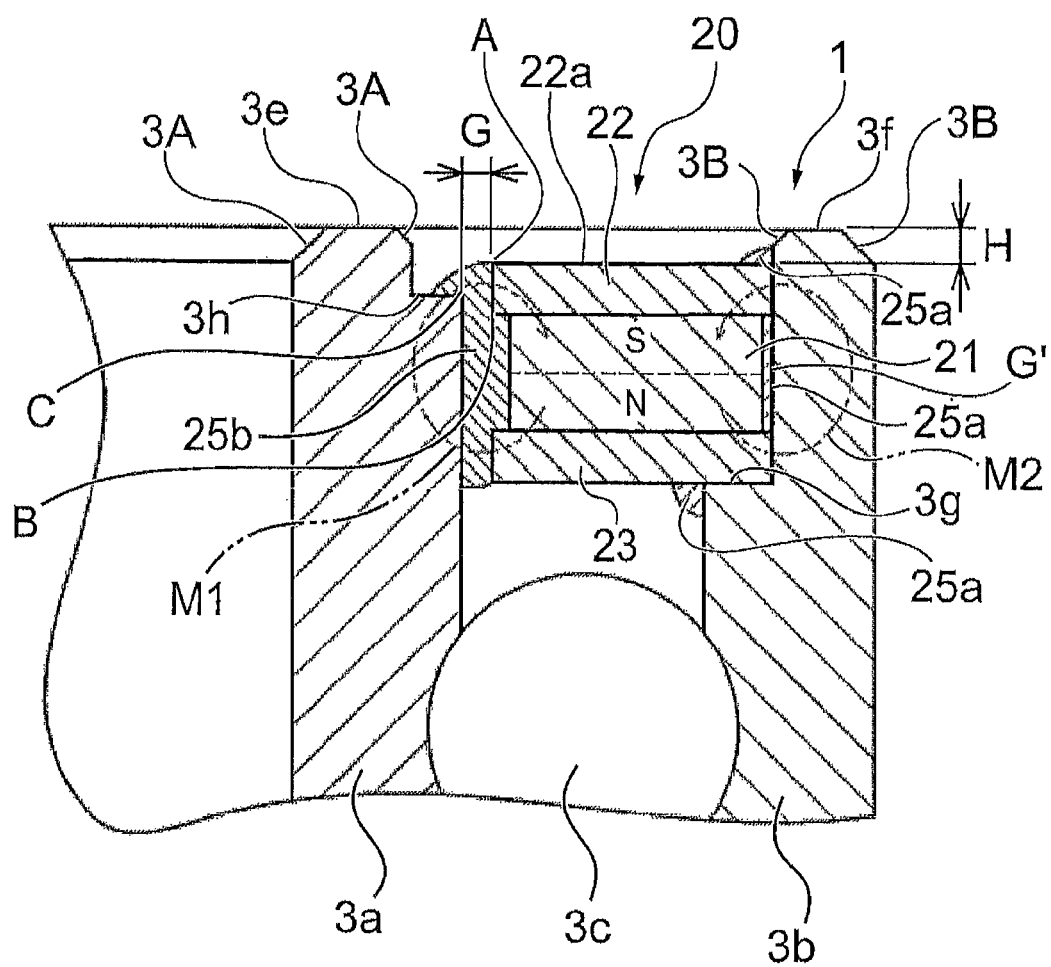
FIG. 2 is an enlarged view of the magnetic fluid sealed bearing shown in FIG. 1.

Embodiments of a magnetic fluid sealed bearing according to the disclosure will be hereinafter described with reference to the drawings. FIGS. 1 and 2 illustrates a first embodiment of a magnetic fluid sealed bearing according to the disclosure, and FIG. 1 shows the whole structure and FIG. 2 is an enlarged view of FIG. 1 showing essential parts.

A magnetic fluid sealed bearing 1 (hereunder also referred to as a bearing 1) according to the disclosure includes an inner ring 3a which is formed in a cylindrical shape and rotatably fitted on a rotation shaft 100, an outer ring 3b which is formed in a cylindrical shape to surround the inner rind and is disposed on a housing 101 (inner frame or the like) of a driving unit, and multiple rolling members (rolling elements) 3c disposed between the inner and outer rings. The rolling members 3c may be retained by retainers (not shown), and allow the inner ring 3a and the outer ring 3b to rotate relative to each other.

The inner ring 3a, the outer ring 3b, and the rolling members 3c according to the embodiment may be formed of a magnetic material such as chrome-based stainless steel (SUS440C); and the retainer may be formed of a highly corrosion-resistant and heat-resistant material such as a stainless steel material (SUS304). The rolling members 3c may not necessarily be magnetic bodies. The rolling members can be formed of, for example, a ceramic-based material which is not affected by magnetic field (therefore the rolling members and the inner and outer rings are not attracted to each other), and it is possible to reduce torque.

In the embodiment, an exposed end surface 3e of the inner ring 3a and an exposed end surface 3f of the outer ring 3b may be coplanar (or substantially coplanar); alternatively, the outer ring 3b may be longer in the axial direction than the inner ring 3a (the outer ring 3b may include an extended cylindrical portion axially projecting relative to the inner ring 3a), or the inner ring 3a may be longer in the axial direction than the outer ring 3b.

In the opening between the inner ring 3a and the outer ring 3b may be provided a magnetic fluid seal 20 (a magnetic sealing mechanism 20). As in the embodiment, the magnetic fluid seal 20 should preferably be provided in both openings between the inner ring 3a and the outer ring 3b to enhance the sealing in the bearing; alternatively, the magnetic fluid seal may be provided only in one of the openings.

The magnetic fluid seal 20 may include a ring-shaped magnet 21, a ring-shaped outer polar plate 22 disposed on the axially outer side surface of the magnet 21 and fixed on one of the inner ring 3a and the outer ring 3b (the outer ring in this embodiment), and a ring-shaped inner polar plate 23 disposed on the axially inner side surface of the magnet 21 and fixed on the same side as the outer polar plate 22. The magnet 21 is situated and supported between the outer polar plate 22 and the inner polar plate 23. The magnetic fluid seal 20 may also include magnetic fluids (an outer ring magnet fluid 25a and an inner ring magnetic fluid 25b) retained in magnetic circuits formed by the magnet 22. These members may constitute a function of sealing for shutting out dust, water, etc. from the rolling members 3c. A clearance G where the magnetic fluid is retained is formed between an inner surface of the inner ring 3a and unfixed sides (sides closer to the inner ring 3a in this embodiment) of the magnet 21 and the polar plates 22, 23.

The magnet 21 may be a permanent magnet having a high flux density and a high magnetism, such as a neodymium magnet prepared by sintering. The magnet 21 may be previously magnetized such that the magnetic poles (the S-pole, the N-pole) point to the axial directions (the directions X of the axial core of the bearing). The outer polar plate 22 and the inner polar plate 23 that hold the magnet 21 therebetween may have substantially the same shape as the magnet 21 and may be formed of a magnetic material such as chrome-based stainless steel (SUS430).

The magnet 21 and the both polar plates 22, 23 may be or may not be bonded to each other in advance. When these two elements are previously bonded to each other, the magnet 21 can be readily positioned or centered, and the magnet 21 and the polar plates 22, 23 are integrated into a unit that can be readily built in.

The outer ring magnetic fluid 25a and the inner ring magnetic fluid 25b may be prepared by dispersing magnetic fine particles such as $Fe_3O_4$ into a base oil (using a surfactant) so as to have viscosity and react with a magnet brought close. Thus, the magnetic fluids 25a, 25b may be stably retained in position by the magnet 21 and the magnetic circuits M1, M2 formed between the inner ring 3a, the outer ring 3b, and the polar plates 22, 23 made of a magnetic material.

In the embodiment, a step 3g may be formed on the inner surface of the outer ring 3b at a position on the rolling member side with respect to the magnet 21. Due to the presence of the step 3g, the outer ring 3b may be thinner near the opening and thicker near the rolling members. Thus, the distance between the inner ring and the outer ring is larger in the axially outer regions than in the axially inner region. By providing the step 3g, it is possible to perform accurate alignment of the inner polar plate 23 that is inserted from the opening. The step 3g in the embodiment may be formed to have a vertical surface with respect to the axial direction, therefore, the magnet 21 and the polar plates 22, 23 that are integrated as a single unit can be inserted through the opening until it contacts (or is attracted by) the step 3g (the vertical surface 3g). Thus, the magnet can be readily positioned and fixed.

As in the embodiment, the step 3g may include a staircase or may be sloped (inclined) instead of having a vertical surface with respect to the axial direction X. Alternatively, the step for positioning and fixing the magnet may be formed on the inner ring 3a.

The polar plates 22, 23 may have outer diameters slightly larger than the inner diameter of the outer ring 3b (at the thinner portion) and may be configured to be press-fitted into the opening of the outer ring 3b along with the magnet 21 bonded thereto (the polar plate may be fixed on the outer ring). The polar plates 22, 23 sandwiching the magnet 21 may be built in the bearing by loose fit or magnetic fixing, in addition to press-fit.

The polar plates 22, 23 to which the magnet 21 is bonded may be formed to have a size so as to create a prescribed clearance G with the outer circumferential surface of the inner ring 3a when they are press-fitted into the outer ring 3b. The diameter of the magnet 21 is set to be smaller than the diameters of the polar plates 22, 23, and the end surface of the magnet 21 does not protrude out from the end surfaces of the polar plates 22, 23 in the radial direction when the magnet 21 is attached to the polar plates 22, 23 in the assembled state as illustrated in FIG. 2. It is preferable that the magnet 21 be attached with a small clearance G' from the inner surface of the outer ring 3b in the assembled state. The small clearance G' may be about 0.05-0.10 mm and the outer ring magnetic fluid 25a is retained in the small clearance G'. By providing the small clearance G' and retaining the outer ring magnetic fluid 25a therein, a retention characteristic of the magnetic fluid can be exploited and a sealing effect can be maintained for some extent even if the outer ring magnetic fluid 25a retained between the outer polar plate 22 and the outer ring 3b and the outer ring magnetic fluid 25a retained between the inner polar plate 23 and the outer ring 3b flow out. The small clearance G' may be formed to extend 360 degrees or may be formed partially in the circumferential direction.

In the embodiment, the outer polar plate 22 retaining the magnet 21 may be recessed from the end surface 3f of the outer ring 3b and the end surface 3e of the inner ring 3a. More specifically, the outer polar plate 22 may be positioned such that the end surface 22a thereof facing the opening may be recessed from the end surface 3f of the outer ring and the end surface 3e of the inner ring by an amount H.

The recess amount H should be such that, when the outer ring or the inner ring is pinched by fingers in a maintenance work, the magnetic fluids 25a, 25b retained in the sealing portions are prevented from adhering to the fingers. The recess amount H should range from 0.01 to 1.0 mm, or more preferably from 0.05 to 0.5 mm. That is, if the recess amount H is smaller than 0.01 mm, the magnetic fluids may tend to contact foreign objects or adhere to fingers when the rings are pinched by the fingers; and if the recess amount H is larger than 1.0 mm, the axial length is unwantedly long, which may adversely affect the built-in work. The end surfaces of the inner ring and the outer ring may include tapered portions 3A, 3B, respectively, which extend in the circumferential direction. Such tapered portions may facilitate the built-in work of the bearings.

As stated above, when the polar plates 22, 23 sandwiching the magnet 21 magnetized such that the magnetic poles point to the axial directions is press-fitted into the outer ring 3b, magnetic fluxes (magnetic circuits M1, M2) may be formed at the inner ring 3a and the outer ring 3b so as to be symmetric with respect to the axial direction. Thus, the clearance G between the magnet 21, the polar plates 22, 23 and the inner ring 3a, and the clearance between the magnet 21, the polar plates 22, 23 and the outer ring 3b can retain the inner ring magnetic fluid 25b and the outer ring magnetic fluid 25a, respectively. More specifically, when the clearance G is filled with the magnetic fluid by using an injection apparatus such as a dropper, the magnetic circuit M1 formed on the inner ring side may produce a seal in the clearance G (at least one of the clearance between the inner ring 3a and the outer polar plate 22, the clearance between the inner ring 3a and the inner polar plate 23, and the clearance between the inner ring 3a and the magnet 21) with the inner ring magnetic fluid 25b. When the boundary area between the outer ring 3b and the outer polar plate 22 is filled with the magnetic fluid by using an injection apparatus such as a dropper, the magnetic circuit M2 formed on the outer ring side may produce a seal in at least one of the clearance between the outer ring 3b and the outer polar plate 22, the clearance between the outer ring 3b and the inner polar plate 23, and the clearance (the small clearance G') between the outer ring 3b and the magnet 21 with the inner ring magnetic fluid 25a. In other words, when the clearance between the outer ring 3b and the outer polar plate 22 is filled with the magnetic fluid, the magnetic fluid penetrates toward the rolling member and is then retained in the above-mentioned clearances. Moreover the filled magnetic fluid swells and is retained at the filled position so that a secure seal is made around the outer ring. Moreover, since the step 3g is formed, the boundary area between the edge region of the step and the inner polar plate 23 also retains the magnetic fluid and the magnetic fluid swells thereon, which increases the sealing effect.

In the embodiment, the inner ring 3a may be provided with a step 3h for retaining the magnetic fluid. Such a step 3h formed in the portion of the clearance between the outer polar plate 22 and the inner ring 3a may allow the magnetic fluid 25b to be retained in the recessed position without swelling up from the exposed end surface 22a of the polar plate 22. If an edge C of the step 3h is below an edge B of the outer polar plate 22, the magnetic fluid may not be sufficiently retained between the outer polar plate 22 and the inner ring 3a; in contrast, if the edge C of the step 3h is above the edge A of the outer polar plate 22, the magnetic fluid may project and tend to adhere to foreign objects. Therefore, the step 3h should preferably be formed such that the edge C is positioned within the axial thickness of the outer polar plate 22 (between A and B). Such a step for forming a clearance may be formed on the outer ring if the polar plate is fixed on the inner ring.

The magnetic fluid sealed bearing 1 configured as described above is disposed on position where it supports a rotation shafts (driving shafts) of various driving units. As described above, the ring-shaped magnet 21 and the outer and inner polar plates 22, 23 sandwiching the magnet retain the inner ring magnetic fluid 25b and the outer ring magnetic fluid 25a at the inner and outer rings respectively, therefore it is possible to securely prevent foreign substances such as dust and water which tend to run down along the inner surfaces of the inner ring 3a and the outer ring 3b. Therefore, the rotation performance of the bearing will not be degraded and it is possible to keep smooth rotation of the rotation shaft 100 for a long period.

Although the inner ring magnetic fluid 25b and the outer ring magnetic fluid 25a are retained by the magnetic circuits M1, M2, another magnetic circuit that is directed from the outer polar plate 22 toward the inner polar plate 23 is formed by the inner polar plate 23 situated between the magnet 21 and the rolling member 3c so that the magnetic field around the rolling member 3c is not strong. Therefore the attraction force between the rolling member 3c and the inner and outer rings 3a, 3b is reduced and thus the torque can be also reduced.

The above described components of the magnetic fluid sealed bearing 1 should preferably be corrosion resistant. This is because these components may rust due to adhered salt if seawater and the like penetrates into the region not sealed with the magnetic fluids 25a, 25b. More specifically, the inner ring 3a, the outer ring 3b, and the outer polar plate 22 may be subjected to anti-corrosion surface treatment such as electrolytic chromic acid treatment or electroless nickel plating, so as to enhance the corrosion resistance of these components. Thus, rusting of an exposed region not sealed with the magnetic fluid seal 20 can be effectively prevented. Alternatively, the components may be made of a highly corrosion resistant material (high corrosion resistance material), instead of being subjected to such a surface treatment. Examples of the high corrosion resistance material may include a stainless steel-based material containing Cr or Mo having excellent corrosion resistance. Such a material can be corrosion resistant against salt water with Cr content of about 12 to 18% or Mo content of about 1 to 3%. At least one of the inner ring 3a, the outer ring 3b, and the outer polar plate 22 should be subjected to the anti-corrosion treatment or made of the high corrosion resistance material.

Figure 3:
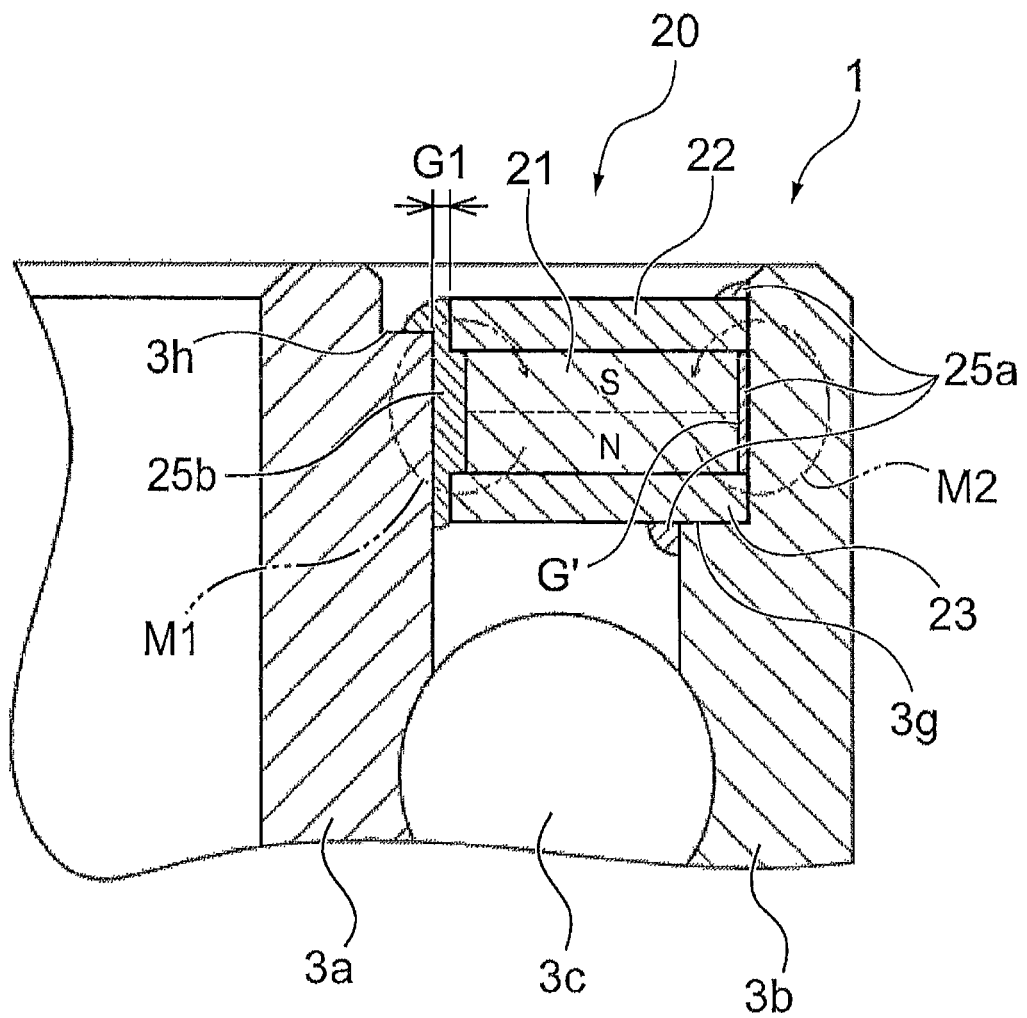
FIG. 3 illustrates a modification example of the magnetic fluid sealed bearing shown in FIG. 2.

FIG. 3 illustrates a modification example of the magnetic fluid sealed bearing shown in FIG. 2. In this modification example, the clearance G1 formed on the inner ring 3a side is made smaller than the clearance G of FIG. 2 (G1<G).

As described above, the smaller the clearance where the magnetic fluid is retained, the stronger the magnetic force of the magnetic circuit M1, therefore it is possible to stably retain the magnetic fluid (the inner ring magnetic fluid 25b) therein. However, when the clearance becomes smaller, the attraction force to bring the inner and outer rings close to each other in the radial direction increases and this causes a load (resistance) on the rotation of the rotation of the rolling member 3c, resulting in a higher torque. More specifically, torque measurements were performed for a magnetic fluid sealed bearing in which the inner diameter of the inner ring 3a is 7 mm, the outer diameter of the outer ring 3b is 13 mm, and the length in the axial direction is 5 mm. The torque measurements were performed with the clearance having a value (G1 is 0.06 mm, and G is 0.15 mm) different from the above mentioned value. The results of the measured torque was 1.4 g·cm for the configuration shown in FIG. 3 and 0.8 g·cm for the configuration shown in FIG. 2. As demonstrated by the measurements, it is possible to reduce the torque of the bearing when the large clearance in which the magnetic fluid is filled (the clearance formed on the unfixed side of the polar plate) is secured. Thus, the clearance G can be changed so as to meet required characteristics (the strength of the magnetic fluid sealing film retained in the clearance, and a required torque) of apparatus in which the bearing is mounted.

Figure 4:
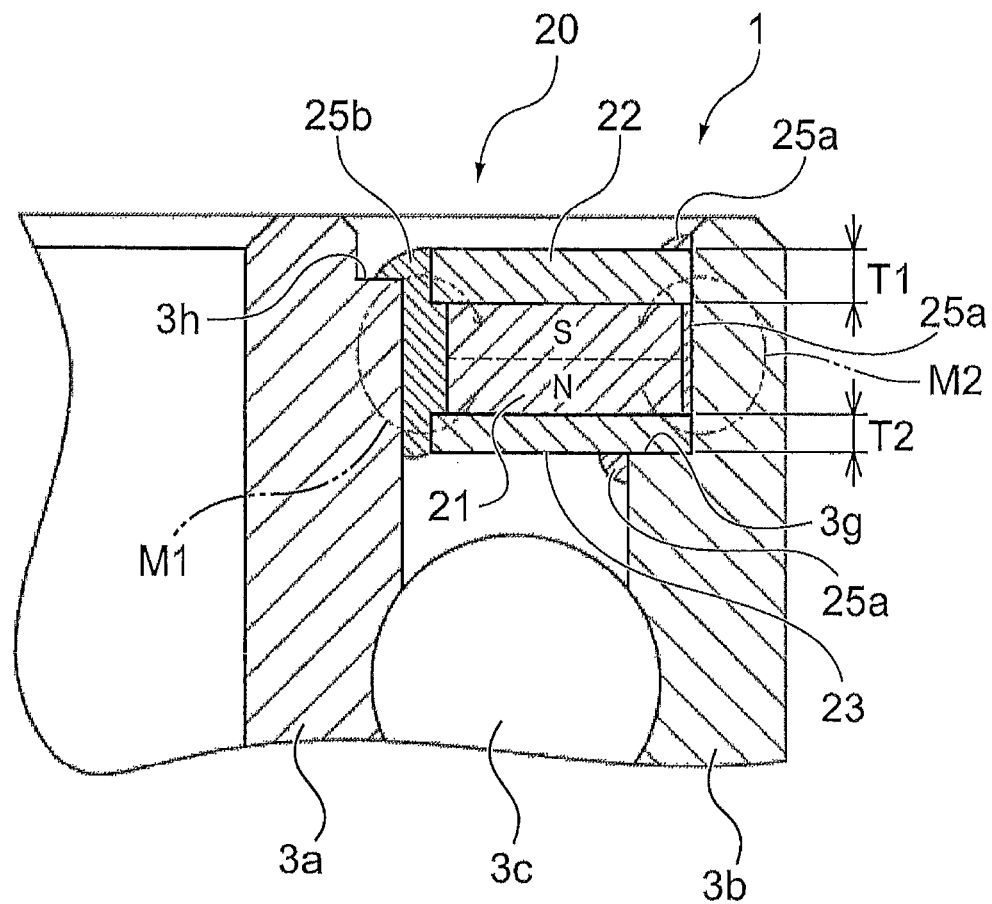
FIG. 4 is an enlarged view of the magnetic fluid sealed bearing showing a second embodiment.
Figure 5:
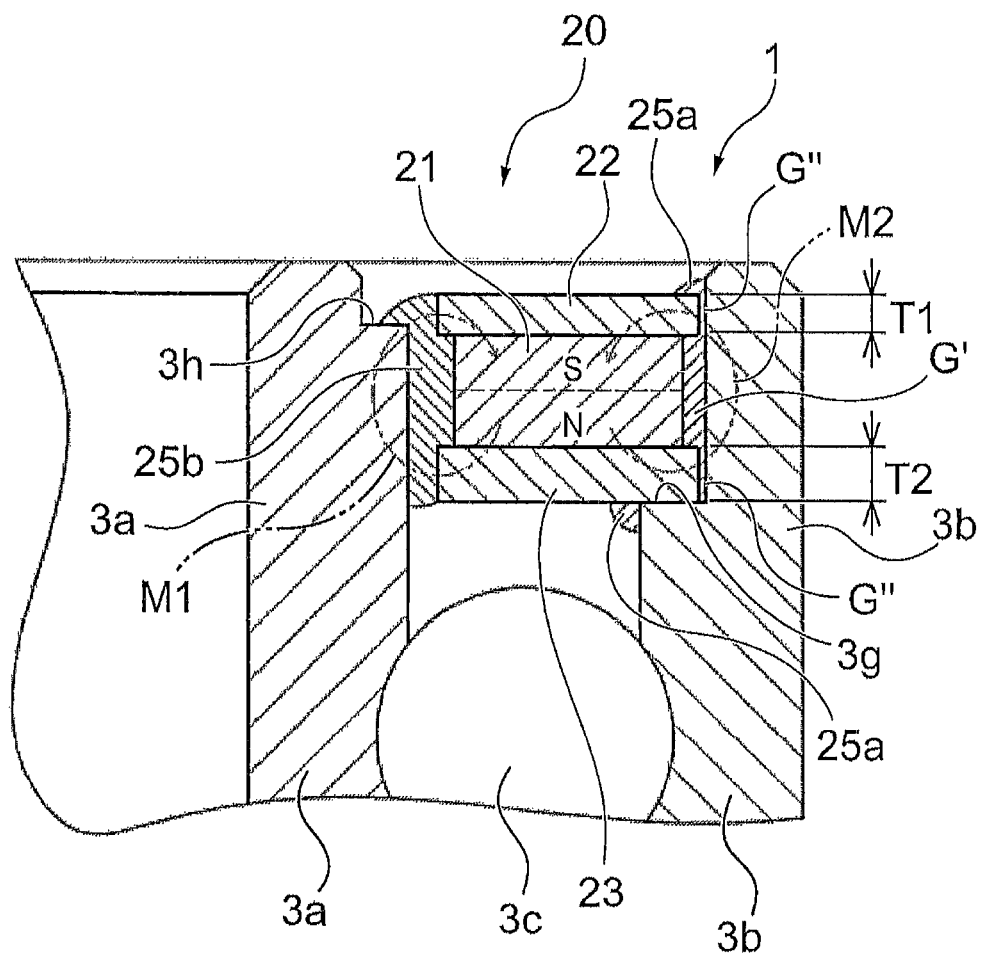
FIG. 5 illustrates a modification example of the magnetic fluid sealed bearing shown in FIG. 4.

FIG. 4 is an enlarged view of a magnetic fluid sealed bearing to illustrate a second embodiment, and FIG. 5 illustrates a modification example of the magnetic fluid sealed bearing of FIG. 4.

The thicknesses T1, T2 of the outer polar plate 22 and the inner polar plate 23 may be made same to each other as described in the previous embodiment, however the flux density of the magnetic circuit can be made different between the outer side and the inner side by making one of the thicknesses larger than the other. More specifically, when the thickness T1 of the outer polar plate 22 is larger than the thickness T2 of the inner polar plate 23 (T1>T2) as illustrated in FIG. 4, an area where the magnetism flows in the outer polar plate 22 is made larger. As a result, the magnetic flux of the magnetic circuits M1, M2 is smaller on the outer polar plate side and the magnetic strength is relatively higher in the inner polar plate region. In other words, the magnetic force generated on the rolling member 3c side is increased, and the attraction force between the rolling member 3c and the inner and outer rings 3a, 3b with which the rolling member is contacted is accordingly increased. This works as resistance that increases the torque.

Therefore, in order to realize a magnetic fluid sealed bearing with a low torque, the thickness T2 of the inner polar plate 23 is made larger than the thickness T1 of the outer polar plate 22 (T2>T1) as illustrated in FIG. 5, an area where the magnetism flows in the inner polar plate 23 is made larger. As a result, the magnetic flux of the magnetic circuits M1, M2 is smaller on the inner polar plate side and the magnetic strength is relatively larger in the outer polar plate region. In other words, the magnetic force generated on the rolling member 3c side is decreased, and the attraction force between the rolling member 3c and the inner and outer rings 3a, 3b with which the rolling member is contacted is accordingly decreased, resulting in a low torque.

The magnet 21 and the polar plates 22, 23 that are integrated into a unit can be positioned by utilizing the step 3g when the unit is inserted through the opening until it contacts the step 3g, so that the outer diameter of the unit can be set with a certain allowance with respect to the opening diameter as illustrated in FIG. 5. In other words, because some allowance is given to the size of the unit, small clearances G', G" are created between the inner surface of the outer ring 3b and the outer surface of the unit when the unit is inserted through the opening, and these clearances may be filled with the magnetic fluid so as to increase the sealing effect.

Figure 6:
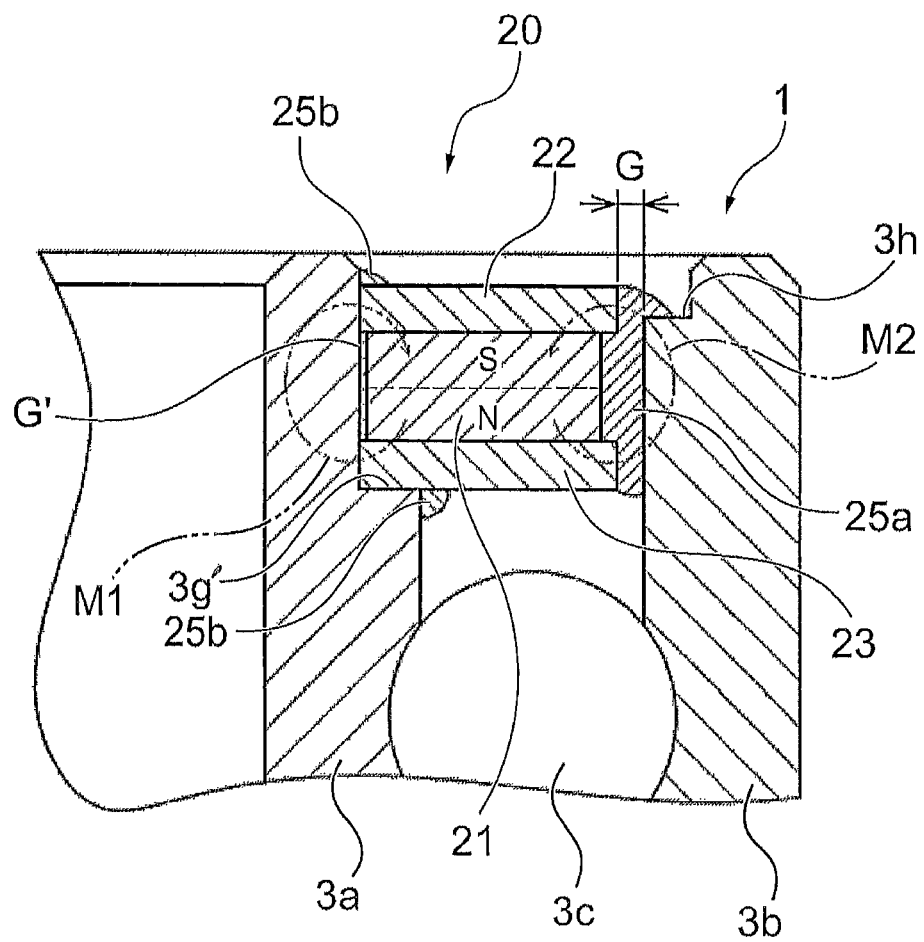
FIG. 6 is an enlarged view of the magnetic fluid sealed bearing showing the second embodiment.

Although the magnetic fluid seal 20 described above has the polar plates 22, 23 that are fixed to the outer ring (fixed portions of the plates are situated on the outer ring side), the polar plates may be fixed to the inner ring as illustrated in FIG. 6. In other words, a step 3g' having the same configuration as the step 3g formed on the outer ring in the previous embodiment may be formed on the inner ring 3a, and the inner polar plate 23 is contacted with the step 3g' to form the clearance G with the inner surface of the outer ring 3b. This arrangement also produces the same effect as the above embodiment.

The above-described magnetic fluid sealed bearing 1 can be used as a support member for a rotation shaft of various driving unit. For example, it can be used as a support member for a rotation shaft of a drive force transmission mechanism installed on various fishing reels (a spinning reel, a double-bearing reel, an electric reel, and the like). Fishing reels are usually used under a harsh environment where water, salts, sands, dusts and the like exist. When the above-described magnetic fluid sealed bearing 1 is installed on the fishing reels, the rotation performance of the rotation shaft rotationally driven by handle operation or the like can be enhanced and it is possible to keep stable rotation of the rotation shaft for a long period.

When the above-described low-torque bearing is used as a support member for a spool shaft of a double-bearing reel which is used for baitcasting among others, it is possible to enhance free-rotation of the spool in addition to the water and dust proof effects.

Figure 7:
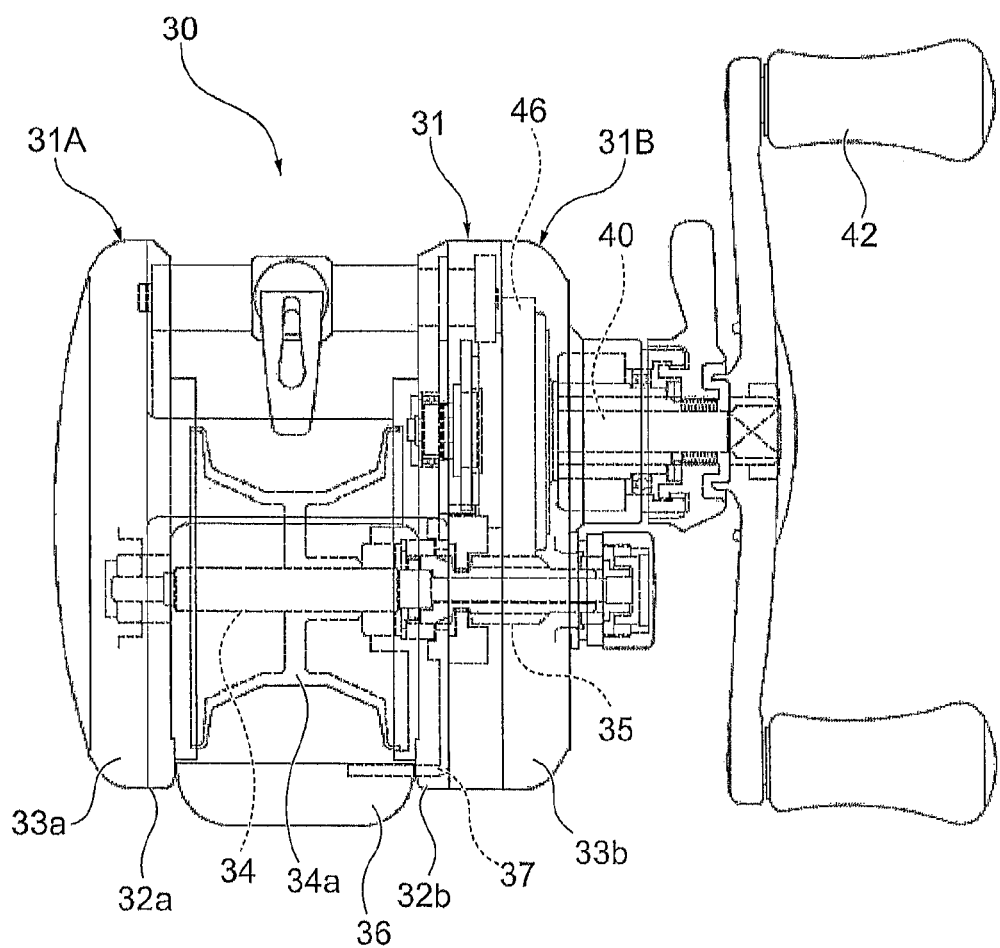
FIG. 7 illustrates an example of a fishing reel in which the magnetic fluid sealed bearing is provided on a rotation shaft.
Figure 8:
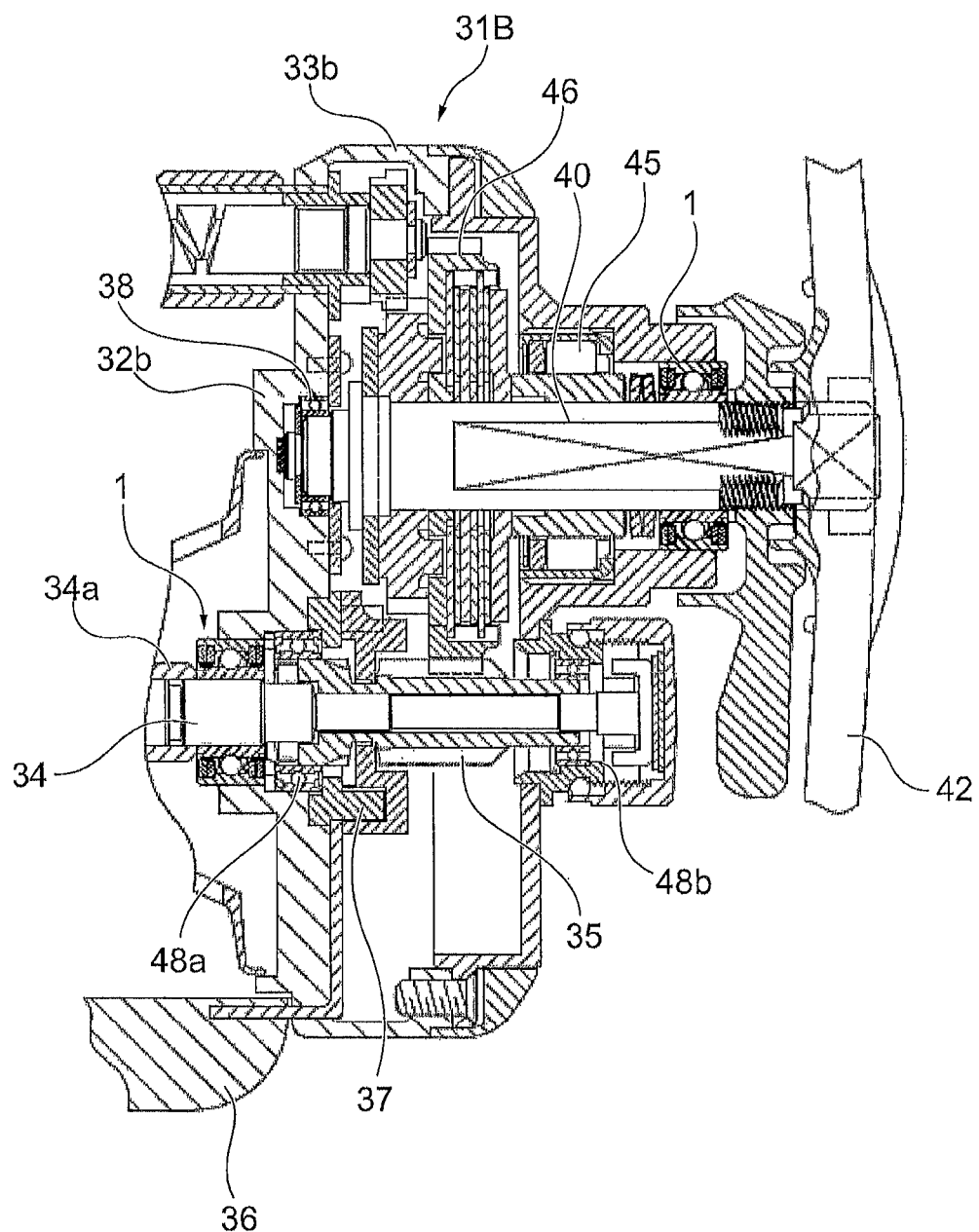
FIG. 8 illustrates a drive force transmission mechanism of the fishing reel shown in FIG. 7.
Figure 9:
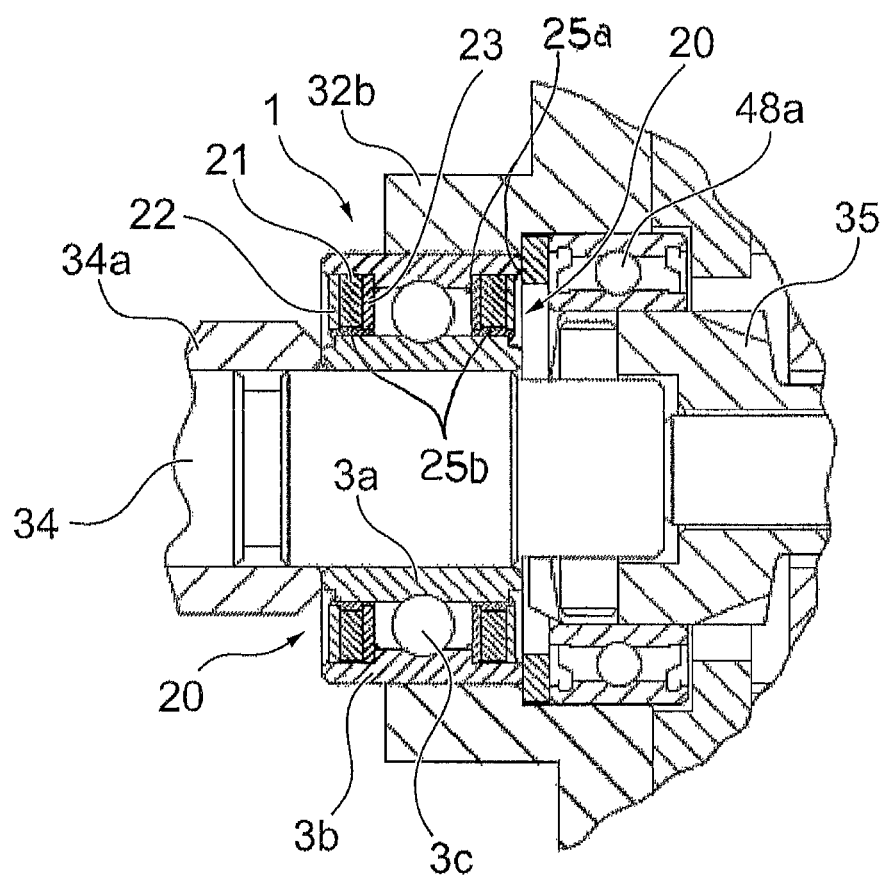
FIG. 9 is an enlarged view of a spool shaft of the fishing reel shown in FIG. 7.
Figure 10:
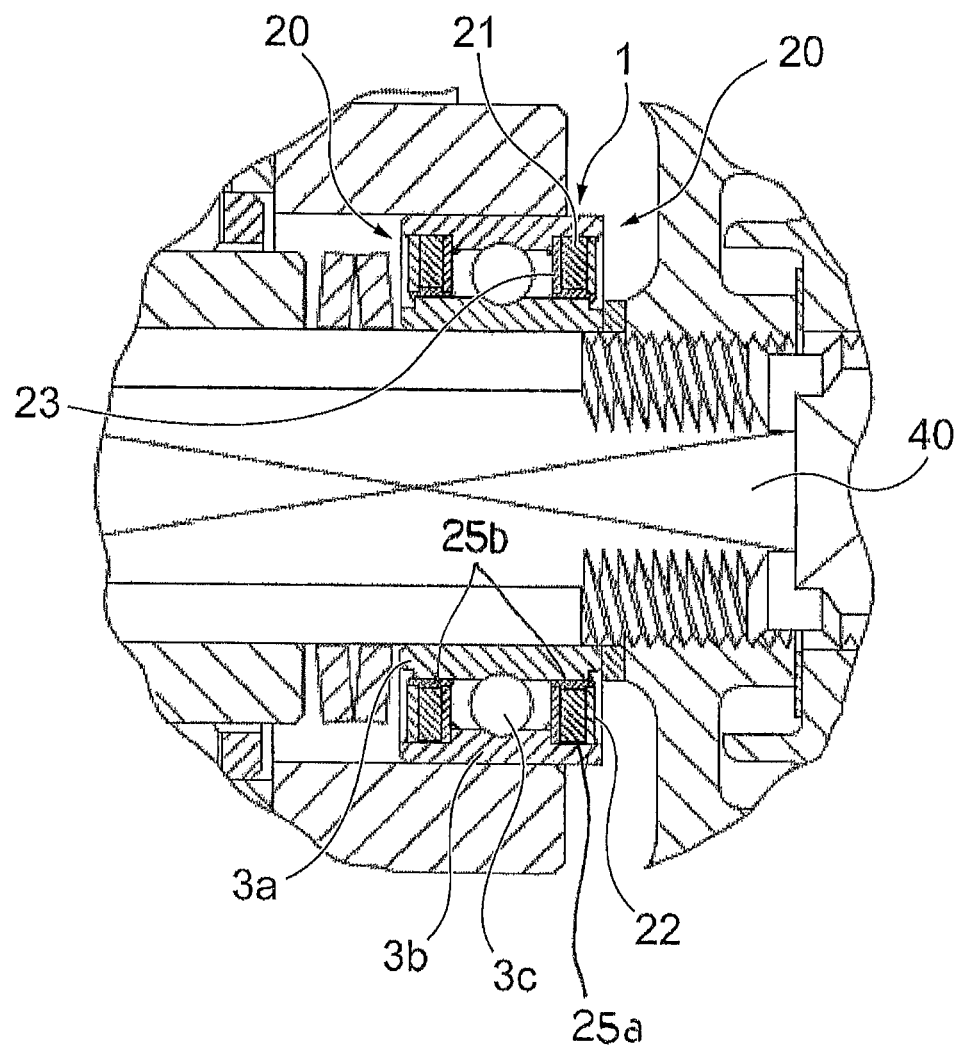
FIG. 10 is an enlarged view of a handle shaft of the fishing reel shown in FIG. 7.

FIGS. 7 to 10 show an embodiment of the fishing reel according to the present disclosure (a double bearing reel), wherein FIG. 7 shows the entire structure, FIG. 8 is an enlarged view showing a drive force transmission mechanism shown in FIG. 7, FIG. 9 is an enlarged view of a spool shaft shown in FIG. 7, and FIG. 10 is an enlarged view of a handle shaft portion of the fishing reel shown in FIG. 7.

In this embodiment, the above-described magnetic fluid sealed bearing 1 is provided as a support member for the spool shaft that rotatably supports a spool and a support member for the handle shaft of a handle that is used for winding operation.

The reel body 31 of the double bearing reel 30 according to the embodiment may include a left side plate 31A having a left frame 32a and a cover member 33a attached thereto and a right side plate 31B having a right frame 32b and a cover member 33b attached thereto. Between the left and right side plates 31A, 31B, a spool shaft 34a may be rotatably supported via the bearing 1. A spool 34a for winding a fishing line may be integrally fixed on the spool shaft 34. The outer ring 3b of the bearing 1 is attached to the left and right frames 32a, 32b and the spool shaft 34 is made rotatable.

On an end of the spool shaft 34 may be mounted a pinion gear 35 movable along the axial direction of the spool shaft. The pinion gear may either support the spool shaft extended coaxially with the pinion gear or rotatably support a spindle rotatably disposed coaxially with the spool shaft.

The pinion gear 35 can be moved by a well-known switching means between an engagement position where the pinion gear 35 engages with the spool shaft 34 and rotates integrally with the spool shaft 34 (a power transmitting state or a clutch-on state) and a non-engagement position where the pinion gear 35 is disengaged from the spool shaft 34 (an idling state or a clutch-off state). The switching means may include a switching lever 36 disposed between the left and right side plates 31A, 31B and a clutch plate 37 that rotates upon pressing down of the switch lever 36. When the switching lever 36 is pressed down, the switching means may switch from the power transmitting state to the idling state via the clutch plate 37.

Within the right side plate 31B, a handle shaft 40 may be rotatably supported via a bearing 38 disposed between the right frame 32b and the handle shaft 40 and the bearing 1 disposed between the right cover member 33b and the handle shaft 40; and a handle 42 may be mounted on an end of the handle shaft 40. Between the handle shaft 40 and the right cover member 33b may be disposed a one-way clutch 45 as a backstop; and the handle shaft 40 (handle 42) may be rotated only in the direction of winding the fishing line and prevented from rotating reversely.

The pinion gear 35 may be meshed with a drive gear 46 supported by the handle shaft 40; and when the handle 42 mounted on the end of the handle shaft 40 is rotationally operated, the spool shaft 34 may be rotationally driven via the drive gear 46 and the pinion gear 35, and accordingly the spool 34a may be rotated to wind the fishing line.

Among others, this type of fishing reels requires a high rotation performance of the spool 34a, a conventional bearing therein could not be effectively sealed. While the fishing reel with the above-described magnetic fluid sealed bearing 1, it is possible to obtain the water and dust proof effects and to maintain the rotation performance of the spool. More specifically, even if the fishing reel with the bearing of the disclosure is used in a harsh environment where seawater tends to adhere to and penetrate into the bearing, the seawater is shut out from the interior of the bearing that rotatably supports the rotation shaft (the spool shaft 34, the handle shaft 40), so as to securely prevent degradation of smoothness and maintain stable sealing and smooth rotation of the rotation shaft for a long period.

The sizes of the bearings used for the spool shaft 34 and the handle shaft 40 fall within a certain range (for example, the outer diameter is about 10-20 mm and the inner diameter is about 3-10 mm), and the magnetic fluid sealed bearing 1 having such size can obtain a sufficient sealing effect and can have a low torque when the clearance shown in FIG. 2 is set to 0.05-0.3 mm, preferably to 0.1-0.2 mm. Moreover, in the bearing having the above-described configuration, the thickness of the inner polar plate 23 may be larger than the outer polar plate 22 as illustrated in FIG. 5 to achieve a low torque effectively, and thereby it is possible to prevent the free rotation of the spool from being affected. The double bearing reel of the embodiment may have the same sealing structure of the bearing 1 in the bearings 48a, 48b rotatably supporting the pinion gear 35 and in the bearing 38 rotatably supporting the handle shaft at the proximal end of the handle shaft 40.

When the above-described magnetic fluid sealed bearing 1 is built into position, a magnetic body (magnetic material) presenting around the position may attract the bearing 1 to reduce the built-in work efficiency or may form another magnetic circuit in the vicinity to move the magnetic fluid and reduce the sealing quality. To facilitate built-in of the above magnetic fluid sealed bearing 1 into the frame and cover of the reel body 1, the parts radially or axially adjacent to the bearing 1, such as the reel body, the frame, the shafts, the cover, and a housing, should preferably be made of a nonmagnetic material (aluminum, austenite-based stainless steel, copper alloy, resin, etc.). Such configuration may enhance the built-in work efficiency and maintain a secured sealing quality.

Embodiments of the present disclosure are not limited to the above descriptions and are susceptible to various modifications for implementation.

The above described magnetic sealing mechanism is a mere example and is susceptible of appropriate modifications in configuration and arrangement of the magnet and the polar plate. For example, the magnet retained by the polar plate may be supported by one polar plate; and various modifications are possible in positioning of the outer ring and the inner ring in the axial direction and in sealing of the surface of the outer ring and the surface of the inner ring.

What is claimed is:

1. A magnetic fluid sealed bearing comprising:
   an inner ring;
   an outer ring;
   a plurality of rolling members placed between the inner and outer rings; and
   a ring-shaped magnet disposed in an opening between the inner and outer rings to retain a magnetic fluid for sealing the plurality of rolling members, the ring-shaped magnet being magnetized such that their magnetic poles point to an axial direction;
   ring-shaped outer and inner polar plates sandwiching the ring-shaped magnet therebetween, one side of the polar plates being fixed to one of the inner ring and the outer ring, and the other side of the polar plates facing a clearance;
   an outer ring magnetic fluid retained in at least one selected from the group consisting of between the outer ring and the outer polar plate, between the outer ring and the inner polar plate, and between the outer ring and the magnet; and
   an inner ring magnetic fluid retained in at least one selected from the group consisting of between the inner ring and the outer polar plate, between the inner ring and the inner polar plate, and between the inner ring and the magnet,
   wherein a step for retaining the inner ring magnetic fluid or the outer ring magnetic fluid is formed on the inner ring or the outer ring in a clearance with the outer polar plate such that an edge of the step is positioned within an axial thickness of the outer polar plate.

2. The magnetic fluid sealed bearing of claim 1, wherein the inner polar plate has a larger thickness than the outer polar plate.

3. The magnetic fluid sealed bearing of claim 1, wherein a step is formed on an inner surface of the outer ring or the inner ring on the rolling member side, and the inner polar plate contacts with the step.

4. The magnetic fluid sealed bearing of claim 1, wherein the magnet is sandwiched between the outer polar plate and the inner polar plate such that a small clearance is created between the magnet and an inner surface of the inner ring or the outer ring to which the polar plates are fixed, and the inner magnetic fluid or the outer ring magnetic fluid is retained in the small clearance.

5. The magnetic fluid sealed bearing of claim 1, wherein the outer polar plate is recessed from an end surface of the outer ring and an end surface of the inner ring.

6. The magnetic fluid sealed bearing of claim 1, wherein at least one of the outer ring, the inner ring, and the outer polar plate is subjected to electrolytic chromic acid treatment or electroless nickel plating.

7. The magnetic fluid sealed bearing of claim 1, wherein at least one of the outer ring, the inner ring, and the outer polar plate includes a stainless steel-based high corrosion resistance material.

8. A fishing reel comprising the magnetic fluid sealed bearing of claim 1 as a support member supporting a rotation shaft rotatably.

9. The fishing reel of claim 8, wherein the fishing reel is a double bearing reel, and the magnetic fluid sealed bearing is used for a spool shaft rotatably supporting a spool on which a fishing line is wound.

10. The fishing reel of claim 8, wherein the size of the clearance in which the magnetic fluid of the magnetic fluid sealed bearing is retained is set to 0.05-0.3 mm.

11. The fishing reel of claim 8 wherein parts radially and axially adjacent to the magnetic fluid sealed bearing are formed of a nonmagnetic material.

12. The magnetic fluid sealed bearing of claim 1, wherein the outer ring magnetic fluid is retained at least between the outer ring and the inner polar plate.

13. The magnetic fluid sealed bearing of claim 1, wherein the inner ring magnetic fluid is retained at least between the inner ring and the inner polar plate.

14. A method of sealing a bearing, wherein the bearing comprises: an inner ring; an outer ring; one or more rolling members placed between the inner and outer rings; and a ring-shaped magnet disposed in an opening between the inner and outer rings to retain a magnetic fluid for sealing the plurality of rolling members, the ring-shaped magnet being magnetized such that their magnetic poles point to an axial direction; ring-shaped outer and inner polar plates sandwiching the ring-shaped magnet therebetween, one side of each polar plate being fixed to one of the inner ring and the outer ring, and the other side of each polar plate facing a clearance, the method comprising:
   sealing the bearing with an outer ring magnetic fluid retained in at least one selected from the group consisting of between the outer ring and the outer polar plate, between the outer ring and the inner polar plate, and between the outer ring and the magnet; and
   sealing the bearing with an inner ring magnetic fluid retained in at least one selected from the group consisting of between the inner ring and the outer polar plate, between the inner ring and the inner polar plate, and between the inner ring and the magnet,
   wherein a step for retaining the inner ring magnetic fluid or the outer ring magnetic fluid is formed on the inner ring or the outer ring in a clearance with the outer polar plate such that an edge of the step is positioned within an axial thickness of the outer polar plate.

15. The method of claim 14, wherein in said sealing the outer ring magnetic fluid is retained at least between the outer ring and the inner polar plate.

16. The method of claim 14, wherein in said sealing the inner ring magnetic fluid is retained at least between the inner ring and the inner polar plate.

* * * * *